(12) United States Patent
Mandalia

(10) Patent No.: US 12,055,405 B2
(45) Date of Patent: Aug. 6, 2024

(54) NAVIGATION SYSTEM WITH VOICE ASSISTANT MECHANISM AND METHOD OF OPERATION THEREOF

(71) Applicant: TeleNav, Inc., Santa Clara, CA (US)

(72) Inventor: Hiren Mansukhlal Mandalia, Pleasanton, CA (US)

(73) Assignee: Telenav, Inc., Santa Clara, CA (US)

( * ) Notice: Subject to any disclaimer, the term of this patent is extended or adjusted under 35 U.S.C. 154(b) by 302 days.

(21) Appl. No.: 17/689,376

(22) Filed: Mar. 8, 2022

(65) Prior Publication Data

US 2023/0288218 A1    Sep. 14, 2023

(51) Int. Cl.
*G01C 21/36* (2006.01)

(52) U.S. Cl.
CPC ..... *G01C 21/3629* (2013.01); *G01C 21/3608* (2013.01)

(58) Field of Classification Search
CPC ............ G01C 21/3629; G01C 21/3608; G01C 21/3655; G01C 21/36
See application file for complete search history.

(56) References Cited

U.S. PATENT DOCUMENTS

| | | | |
|---|---|---|---|
| 10,643,615 | B2 | 5/2020 | Pan |
| 11,541,891 | B2* | 1/2023 | Aoki .................... B60W 30/16 |
| 2005/0216185 | A1 | 9/2005 | Takezaki et al. |
| 2015/0160019 | A1 | 6/2015 | Biswal et al. |
| 2017/0369053 | A1* | 12/2017 | Nogimori ............. B60W 30/12 |
| 2018/0281807 | A1* | 10/2018 | Minegishi ............ G06V 20/597 |
| 2018/0286272 | A1 | 10/2018 | McDermott et al. |
| 2019/0304461 | A1 | 10/2019 | Pan |
| 2021/0042106 | A1 | 2/2021 | Akella |
| 2021/0063194 | A1 | 3/2021 | Mahajan et al. |
| 2021/0108926 | A1 | 4/2021 | Tran |
| 2021/0271258 | A1 | 9/2021 | Tran |
| 2021/0381839 | A1 | 12/2021 | Verbeke et al. |
| 2022/0013122 | A1 | 1/2022 | Nadkar et al. |
| 2022/0067768 | A1 | 3/2022 | Shinkar et al. |

* cited by examiner

*Primary Examiner* — Alan D Hutchinson
(74) *Attorney, Agent, or Firm* — Perspectives Law Group, Corp.

(57) ABSTRACT

A navigation system includes: a communication circuit configured to: transmit a sensor data packet collected from an in-vehicle sensor array, and receive a route detail based on the sensor data packet; a control circuit, coupled to the communication circuit, configured to: calculate a cognitive load based on the sensor data packet and the route detail; and manage an audio interaction based on the cognitive load, includes delayed delivery of the audio interaction.

17 Claims, 6 Drawing Sheets

NAVIGATION SYSTEM WITH VOICE ASSISTANT MECHANISM AND METHOD OF OPERATION THEREOF

TECHNICAL FIELD

An embodiment of the present invention relates generally to a navigation system, and more particularly to a system with a voice assistant mechanism.

BACKGROUND ART

Modern driving is full of distractions. With increased traffic congestion, cell phone calls, texts, and navigation instructions bombarding the driver, distracted driving has risen to a major cause of traffic accidents. When these events occur concurrently the driver can be overwhelmed and be distracted for just an instant. Young or inexperienced drivers are more likely to get distracted by the in-vehicle infotainment systems. Research and development in the existing technologies can take a myriad of different directions.

Distracted driving is a primary cause of traffic accidents. Inexperienced and experienced drivers alike can make bad decisions when under unusual stress.

Thus, a need still remains for a navigation system with a voice assistant mechanism to counteract distracted driving. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including: transmitting a sensor data packet collected from an in-vehicle sensor array; receiving a route detail in response to the sensor data packet; calculating a cognitive load based on the sensor data packet and the route detail; and managing an audio interaction based on the cognitive load, includes delayed delivery of the audio interaction beyond an alert distance.

An embodiment of the present invention provides a navigation system, including a communication circuit configured to: transmit a sensor data packet collected from an in-vehicle sensor array, and receive a route detail in response to the sensor data packet; a control circuit, coupled to the communication circuit, configured to: calculate a cognitive load based on the sensor data packet and the route detail; and manage an audio interaction based on the cognitive load, includes delayed delivery of the audio interaction.

An embodiment of the present invention provides a non-transitory computer readable medium including instructions for a navigation system, including: transmitting a sensor data packet collected from an in-vehicle sensor array; receiving a route detail in response to the sensor data packet; calculating a cognitive load based on the sensor data packet and the route detail; and managing an audio interaction based on the cognitive load, includes delayed delivery of the audio interaction.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

The following embodiments can utilize high-definition maps, environmental sensors, and route information to determine a cognitive load experienced by the driver while operating or controlling physical movement of a vehicle. The vehicle movement control can be based on a travel-lane identification along with a current location, and can include a control vehicle speed for providing a lane-specific cruise control feature for the vehicle.

The vehicle movement control can further be based on the cognitive load corresponding to a real-time state or status of a geographic area, including representations, locations, statuses, or a combination thereof of one or more vehicles in the geographic area. The cognitive load of the driver can be based on vehicle data for representing status of a reporting vehicle or device, the vehicle data for representing sensor data associated with an environment or a surrounding of the reporting vehicle or the device, or a combination thereof.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y, Z); where X and Y and Z are three coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "cognitive load" referred to herein can include factors that affect a driver's attention during periods of increased activity, including performing planned maneuvers, dealing with traffic congestion, reaction to maneuvers of proximate vehicles, making inquiries of the in-vehicle infotainment system, being distracted by other activities, and receiving navigation instructions. An increase in the cognitive load can increase the probability that the driver will miss an instruction or increase the risk of an accident. The term "infotainment system" can be identified as the circuits and systems that provide navigation instructions, music, point-of-interest identification and support, cell phone/text to voice interaction, vehicle alert notifications, or combinations thereof.

Many embodiments or aspects of the present disclosure described below can take the form of computer-executable or controller-executable instructions, including routines executed by a programmable computer or controller. Those skilled in the relevant art will appreciate that the disclosed techniques can be practiced on computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices, including palm-top computers, wearable computers, cellular or mobile phones, multi-processor systems, processor-based or programmable consumer electronics, network computers, mini computers, and the like. Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

The term "module" referred to herein can include or be implemented as or include software running on specialized hardware, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a "module" or "unit" is written in the system claims section below, the "module" or "unit" is deemed to include hardware circuitry for the purposes and the scope of the system claims.

The modules or units in the following description of the embodiments can be coupled or attached to one another as described or as shown. The coupling or attachment can be direct or indirect without or with intervening items between coupled or attached modules or units. The coupling or attachment can be by physical contact or by communication between modules or units, such as wireless communication.

It is also understood that the nouns or elements in the embodiments can be described as a singular instance. It is understood that the usage of singular is not limited to singular but the singular usage can be applicable to multiple instances for any particular noun or element in the application. The numerous instances can be the same or similar or can be different.

Figure 1:
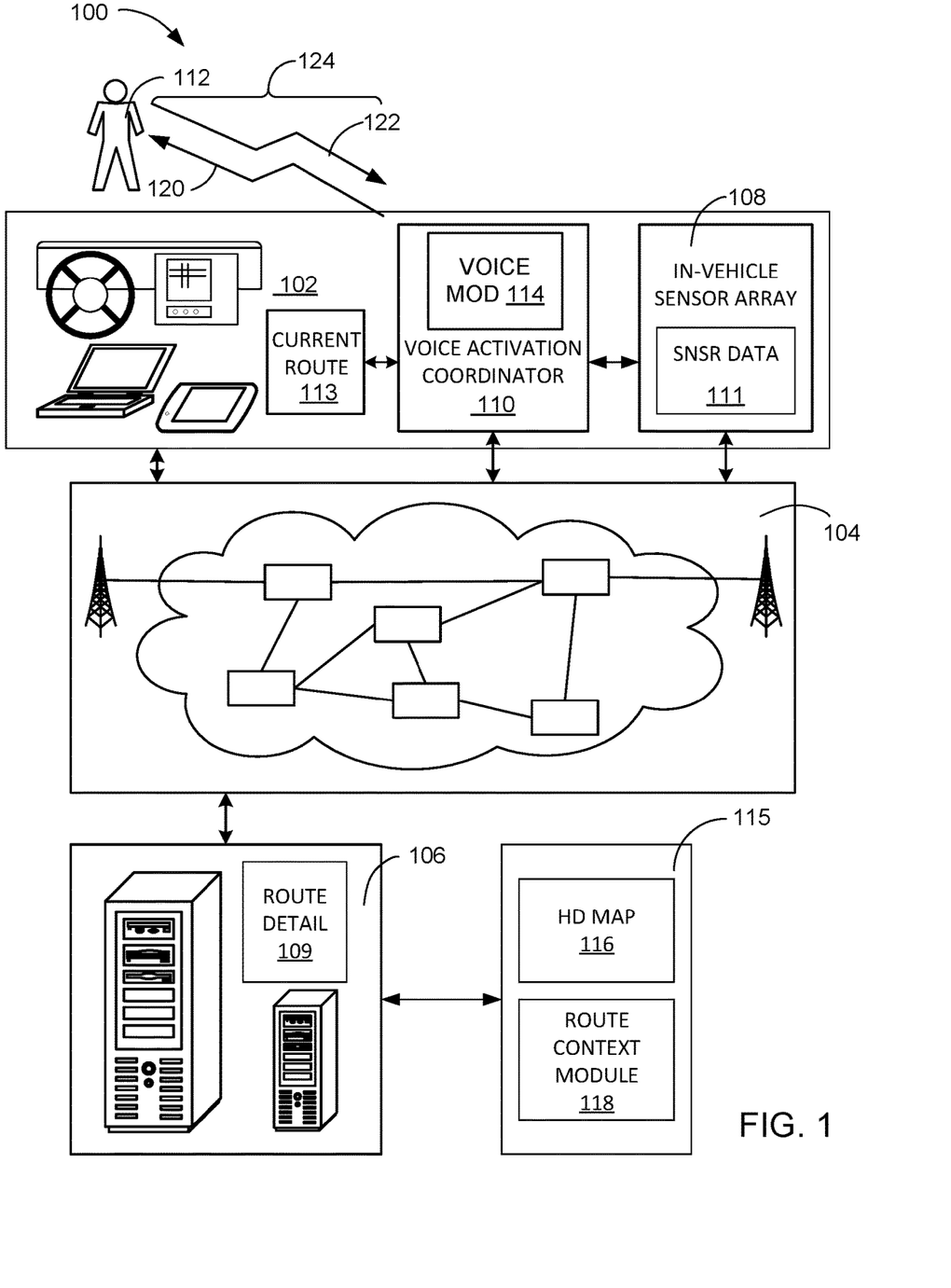
FIG. 1 is a navigation system with a voice assistant mechanism in an embodiment of the present invention.

Referring now to FIG. 1, therein is shown a navigation system 100 with a voice assistant mechanism in an embodiment of the present invention. The navigation system 100 can include a first device 102, such as a client or a server, coupled to a second device 106, such as a client or server.

The navigation system 100 can include a system for searching or providing guidance or information associated with geographic locations, speed control, a regulatory system for enabling access to a device or a vehicle, or a combination thereof. The first device 102 can communicate with the second device 106 through a network 104, such as a wireless or wired network.

For example, the first device 102 can be of any of a variety of computing devices, such as a cellular phone, personal digital assistant, a notebook computer, a wearable device, internet of things (IoT) device, automotive telematics navigation system, or other multi-functional device. Also, for example, the first device 102 can include a device or a sub-system, an autonomous or self-maneuvering vehicle or object, a remote-controlled vehicle or object, or a combination thereof.

The first device 102 can couple, either directly or indirectly, to the network 104 to communicate with the second device 106 or can be a stand-alone device. The first device 102 can further be separate form or incorporated with a vehicle, such as a car, truck, bus, or train.

For illustrative purposes, the navigation system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices, or high-definition video processing devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, a wearable device, or a different type of client device. The second device 106 can be a standalone device, or can be incorporated with a vehicle, such as a car, a truck, a bus, or a train.

Also, for illustrative purposes, the navigation system 100 is described with the second device 106 as a computing device, although it is understood that the second device 106 can be different types of devices. Also, for illustrative purposes, the navigation system 100 is shown with the second device 106 and the first device 102 as end points of the network 104, although it is understood that the navigation system 100 can include a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

The navigation system 100 can provide additional features that are not available in prior art navigation systems. The first device 102 can include a voice assistant coordinator (VAC) 110 and an in-vehicle sensor array 108. The voice assistant coordinator 110 can be software executed on a specific hardware platform, implemented in hardware, or a combination thereof to evaluate the timing for delivery and receipt of information between the navigation system 100 and a user 112. The voice assistant coordinator 110 can receive detailed information from the in-vehicle sensor array 108 of the first device 102 in order to evaluate the amount of cognitive load the user 112 is experiencing. The in-vehicle sensor array 108 provides detailed information about the operation of the first device 102, obstacles or vehicles operating in the area of the first device 102, and the attention of the user 112. For example, the in-vehicle sensor array 108 can provide timely details about the operation and current state of the first device 102. The in-vehicle sensor array 108 can be coupled to the voice assistant coordinator 110 in order to access a sensor data packet 111. The sensor data packet 111 can provide the information captured by the in-vehicle sensor array 108, a time and location of the information that was captured by the in-vehicle sensor array 108 and recorded in the voice assistant coordinator 110. The sensor data packet 111 can include the current position of the first device 102, the current status of the operation of the first device 102, and conditions surrounding the first device 102. The voice assistant coordinator 110 can coordinate the timing of communication between the user 112 and the navigation system 100 to avoid interacting during occurrences of increased cognitive load of the user 112.

The navigation system 100 can be operated by the user 112. The user 112 can include a person or an entity accessing or utilizing the navigation system 100 or a device therein. For example, the user 112 can include a person owning or operating the first device 102, on a current route 113. The current route 113 can be a free driving route or a planned route to a specific destination travelled by the first device 102. Also, for example, the user 112 can access or utilize the second device 106 through the first device 102, a service, or a combination thereof. The current route 113 can provide intersections and possible paths as defined by the user 112.

The navigation system 100 can further process a voice assistant module 114 from the user 112. The voice assistant module 114 can be software executed on a specific hardware platform, implemented in hardware, or a combination thereof. The voice assistant module 114 can be configured to process a request for navigation assistance, location of a point of interest, parking location assistance, restaurant assistance, lodging assistance, location of gas stations, event reservations, entertainment requests, or a combination thereof. The voice assistant module 114 can be accessed by or from the user 112 directly to or indirectly on the first device 102. The voice assistant module 114 can process the input or the stimulus directly for or related to a corresponding software, application, feature, or a combination thereof.

The voice assistant module 114 can be managed by and receive information from the voice assistant coordinator 110 in order to adjust the timing of an audio interaction 124 between the user 112 and the navigation system 100. The audio interaction 124 can be music requested by the user 112, a navigation instruction 120, and a user response 122. As an example, the navigation instruction 120 can be other audio communications, including music, clarification requested for requested services, alert or warning statements of conditions in the first device 102, or warning of road conditions, speed limit changes, as well as instructions to navigate the current route 113. The user response 122 can include requests for information on points-of-interest, services, accommodations, and clarification to previous requests. By way of an example, the audio interaction 124 can include the user 112 requesting a parking reservation, initiating a conference call, or accessing a podcast. While the audio interaction 124 are benign on their own, they can add undue stress to the user 112 and impair the safety of the first device 102 if delivered during occurrences of increased cognitive load of the user 112.

By way of an example, the user 112 can request directions to a gas station nearby. The voice assistant module 114 can receive the request through the user response 122 and pass the request to the voice assistant coordinator 110 for processing. When the voice assistant coordinator 110 identifies the directions to the nearby gas station, the navigation instruction 120 can be passed back to the voice assistant module 114 for announcement to the user 112. During this process, the user 112 can maintain attention on the current route 113 and any obstacles that might force evasive maneuvers of the first device 102, thus reducing the distraction of the user 112 and improving safety.

The second device 106 can support the voice assistant coordinator 110 if the information to identify a location or service is not available in the first device 102. The second device 106 can receive the sensor data packet 111 from the first device 102 through the network 104. The second device 106 can process the sensor data packet 111 in order to produce a route detail 109. The sensor data packet 111 can provide an exact location of the first device 102 in order to provide a context to the second device 106 for compiling the route detail 109. The route detail 109 includes the current route 113 of the first device 102 with the more complex information of the route detail 109, including elevation and geometry of the road, curvature of the road, road surface condition, complex lane changes approaching on the planned route, service providers on the planned route, congestion avoidance, or combinations thereof. By way of an example, the route detail 109 can identify the current route 113 as a four lane divided road constructed of concrete and asphalt with standing water ahead in the rightmost lane. This level of detail from the route detail 109 can enable the navigation system 100 to make adjustments in the current route 113 in order to make a safer and less stress transition through difficult to driving areas.

The second device 106 can process the sensor data packet 111 in order to produce the route detail 109. By way of an example, the second device 106 can verify the sensor data packet 111 by checking the time and location information in order to identify that it represents a region of interest and then compile the information captured by the in-vehicle sensor array 108 with information from a navigation file storage 115 to produce the route detail 109, including the navigation instruction 120 and possible options of the user response 122. The combination of the navigation instruction 120 and the user response 122 is considered an audio interaction 124 that can be managed by the voice assistant module 114.

The second device 106 can be coupled to the navigation file storage 115, such as a random array of independent disks (RAID), solid state storage devices (SSD's), a storage array including both Hard disks and SSD's, or a combination thereof. The navigation file storage 115 can maintain a high-definition map 116 and a route context module 118. By way of an example, the high-definition map 116 can be a record of a physical space of general interest that provides the layout and dimensions of the physical space, including lane status, lane markings, signage, lane surface condition, lighting, and speed limit. The high-definition map 116 can be a section of the navigation file storage 115 used to provide the route detail 109 including all areas of interest that have previously been processed by the navigation system 100. The route context module 118 can be a section of the navigation file storage 115 used to integrate information from the sensor data packet 111 and the high-definition map 116 to determine the areas that represent complex maneuvers required to stay on the current route 113.

By way of an example, the route context module 118 can learn, from the sensor data packet 111, that the first device 102 requires a fuel stop and must exit the current route 113. Based on information from the high-definition map 116, a list of options for a fuel stop can be generated and presented in the route detail 109. The route context module 118 can prioritize the list of possible fuel stop locations based on the ease of exit and re-entry to the current route 113.

Figure 2:
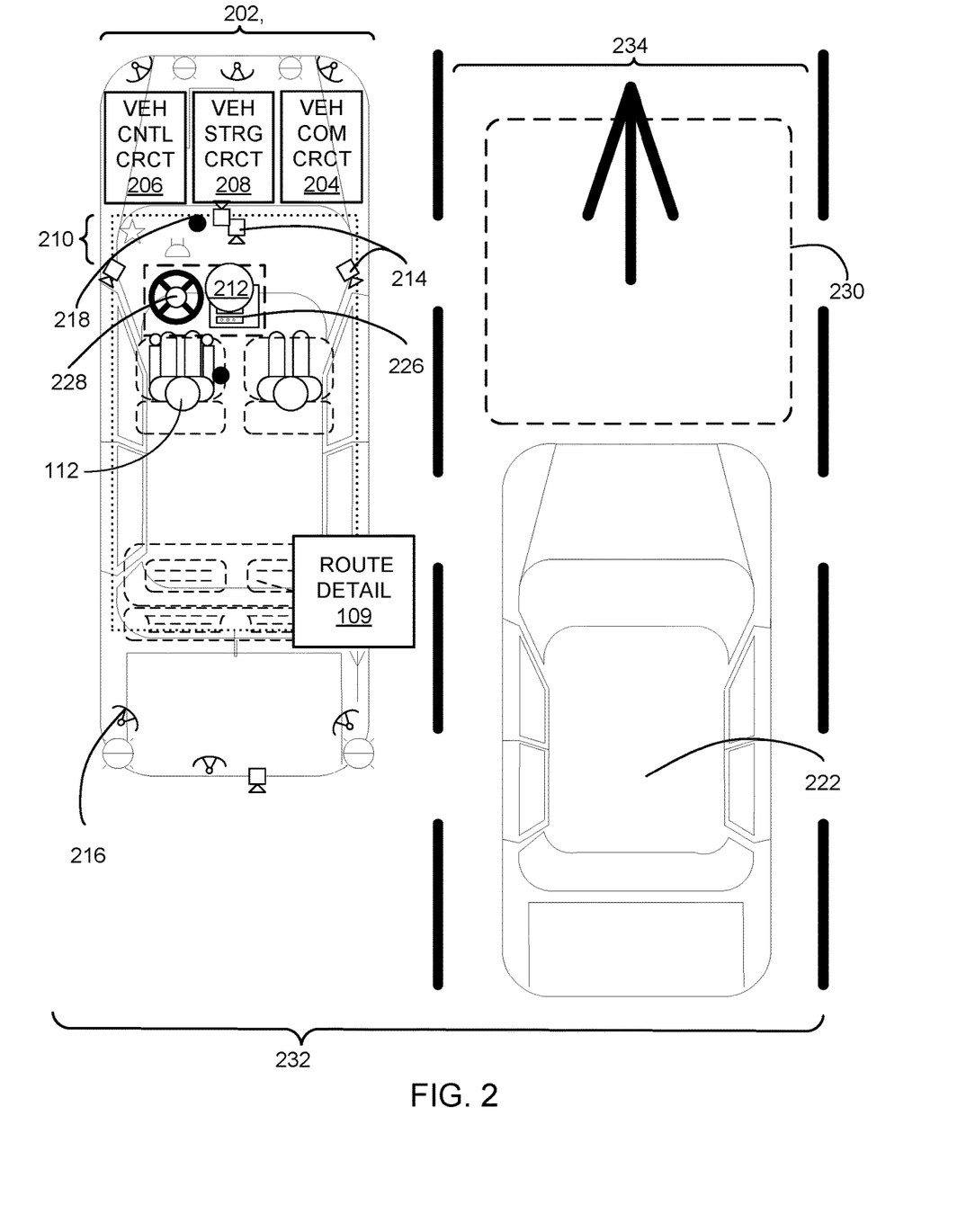
FIG. 2 is an example of a top plan view illustration of various devices for implementing the navigation system.

Referring now to FIG. 2, therein is shown an example of a top plan view illustration of various devices for implementing the navigation system 100 of FIG. 1. The navigation system 100 can include or interact with a vehicle 202.

The vehicle 202 is an object or a machine used for transporting people or goods capable of automatically maneuvering or operating the object or the machine. The vehicle 202 can include vehicles accessible by the user 112 of FIG. 1 for control, maneuver, operation, or a combination thereof. For example, the vehicle 202 can include a car, a truck, a cart, a drone, or a combination thereof.

The vehicle 202 can further be controlled or maneuvered without the voice assistant module 114 of FIG. 1 corresponding to the maneuver or the movement. For example, the vehicle 202 can include a self-driving vehicle, or a vehicle with automatic maneuvering features, such as smart cruise control or preventative breaking. The vehicle 202 can be operated by the user 112 taking advantage of the voice assistant module 114 to provide navigation information and requests for information or services. Also, for example, the vehicle 202 can be controlled or maneuvered by the navigation system 100, including the navigation system 100 controlling or setting a cruising speed or other physical maneuvers or movements of the vehicle 202.

The navigation system 100 can further utilize the route detail 109 of FIG. 1 from one or more vehicles or devices. The route detail 109 can include information regarding the up-coming maneuvers required to keep the vehicle 202 on the current route 113 of FIG. 1 or to satisfy a request from the user 112.

The route detail 109 can include a status, a state, a setting, a description, or a combination thereof regarding the first device 102 of FIG. 1 or the vehicle 202 itself. The route detail 109 can further include information describing or representing surroundings or environment of the first device 102 or the vehicle 202 executing the route detail 109. For example, the route detail 109 can include speed limit data, the navigation instruction 120, accessory or feature status, sensor data, traffic data, road condition data, options for the user response 122, or a combination thereof.

Also, for example, the route detail 109 can include an accessory status 226. The accessory status 226 can represent or describe a state of a circuit, a function, a feature, or a combination thereof for the vehicle 202. As a more specific example, the accessory status 226 can include an on-off state, a level or magnitude, or a combination thereof for lights, environmental settings, door or trunk, windshield wipers, communication settings, braking system, steering direction, signal indicator, or a combination thereof for the vehicle 202.

The vehicle 202 or a proximate vehicle 222 interfacing with the navigation system 100 can include a device, a circuit, one or more specific sensors, such as environmental sensors 210, or a combination thereof for providing assistance or additional information to the user 112 controlling, maneuvering, or operating the vehicle 202. The vehicle 202 or any other vehicles can include a vehicle communication circuit 204, a vehicle control circuit 206, a vehicle storage circuit 208, other interfaces, or a combination thereof.

The vehicle storage circuit 208 can include a functional unit or circuit integral to the corresponding control vehicle and configured to store and recall information, including the navigation instruction 120 of FIG. 1, the route detail 109, the current route 113, the sensor data packet 111 of FIG. 1, system status, or a combination thereof. The vehicle storage circuit 208 can be a volatile memory, a nonvolatile memory, an internal memory, an external memory, or a combination thereof. For example, the vehicle storage circuit 208 can be a nonvolatile storage such as non-volatile random access memory (NVRAM), Flash memory, disk storage, or a volatile storage such as static random access memory (SRAM). The vehicle storage circuit 208 can record simultaneous streams from the in-vehicle sensor array 108, including a visual sensor 214, such as a high-definition camera sensor 214, a radar sensor 216, an accessory sensor 218, or a combination thereof. The separate streams can be combined to generate the sensor data packet 111. The components of the in-vehicle sensor array 108 are discussed in further detail below.

The vehicle storage circuit 208 can store vehicle software, other relevant data, such as input information, information from sensors, processing results, information predetermined or preloaded by the navigation system 100 or vehicle manufacturer, or a combination thereof. The vehicle storage circuit 208 operates as the primary storage for the vehicle control circuit 206.

The vehicle control circuit 206 can include a function unit or circuit integral to the vehicle 202 and configured to execute or implement instructions. The vehicle control circuit 206 can execute or implement the vehicle software to provide the intelligence of the vehicle 202, the navigation system 100, or a combination thereof.

The vehicle control circuit 206 can be implemented in a number of different manners. For example, the vehicle control circuit 206 can be a processor, an application specific integrated circuit (ASIC) an embedded processor, a microprocessor, a hardware control logic, a hardware finite state machine (FSM), a digital signal processor (DSP), or a combination thereof. As a more specific example, the vehicle control circuit 206 can include an engine control unit, one or more central processing unit, or a combination thereof. The vehicle control circuit 206 can communicate with other components of the vehicle 202 or the second device 106 of FIG. 1 through the vehicle communication circuit 204.

The vehicle communication circuit 204 can include a functional unit or circuit integral to the vehicle 202, the proximate vehicle 222, or a combination thereof. The vehicle communication circuit 204 can be configured to enable external communication to and from the vehicle 202. For example, the vehicle communication circuit 204 can permit the vehicle 202 to communicate with the first device 102, the second device 106 of FIG. 1, or a combination thereof.

The vehicle communication circuit 204 can also function as a communication hub allowing the vehicle 202 to function as part of the network 104 and not limited to be an end point or terminal circuit to the network 104. The vehicle communication circuit 204 can include active and passive components, such as microelectronics or an antenna, for interaction with the network 104. For example, the vehicle communication circuit 204 can include a modem, a transmitter, a receiver, a port, a connector, or a combination thereof for wired communication, wireless communication, or a combination thereof.

The vehicle communication circuit 204 can couple with the network 104 to send or receive information directly between the vehicle communication circuit 204 and the first device 102, the second device 106, or a combination thereof as end points of the communication, such as for direct line-of-sight communication or peer-to-peer communication. The vehicle communication circuit 204 can further couple with the network 104 to send or receive information through a server or another intermediate device in between endpoints of the communication.

The vehicle 202 or other vehicles can further include various interfaces. The vehicle 202 can include one or more interfaces for interaction or internal communication between functional units or circuits of the vehicle 202. For example, the vehicle 202 can include one or more interfaces, such as drivers, firmware, wire connections or buses, protocols, or a combination thereof, for the vehicle storage circuit 208, the vehicle control circuit 206, or a combination thereof.

The vehicle 202 can further include one or more interfaces along with switches or actuators for physically controlling movable components of the vehicle 202. For example, the vehicle 202 can include the one or more interfaces along with the controlling mechanisms to physically perform and control the maneuvering of the vehicle 202, such as for manual steering, autonomous driving, smart cruise control, or maneuvering features.

The functional units or circuits in the vehicle 202 can work individually and independently of the other functional units or circuits. The vehicle 202 can work individually and independently from the first device 102, the network 104, the second device 106, other devices or vehicles, or a combination thereof.

The functional units or circuits described above can be implemented in hardware. For example, one or more of the functional units or circuits can be implemented using a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

The environmental sensors 210 are each a device or a circuit for detecting or identifying environment of the corresponding vehicle. The environmental sensors 210 can detect, identify, determine, or a combination thereof, such as for status, surroundings or movement for the corresponding vehicle. The environmental sensors 210 can detect, identify, determine, or a combination thereof for environment within a cabin of the vehicle 202, an environment external to and surrounding the vehicle 202, or a combination thereof. The environmental sensors 210 can be implement for the vehicle 202, a proximate vehicle 222, the first device 102, or a combination thereof.

For example, the environmental sensors 210 can include a location-movement sensor 212, the visual sensor 214, such as the high-definition camera sensor 214, the radar sensor 216, the accessory sensor 218, or the combination thereof. The location-movement sensor 212 can include a sensor for identifying or calculating a geographic location of the vehicle 202 or the first device 102, determining a movement or speed of the vehicle 202 or the first device 102, or a combination thereof. The location-movement sensor 212 can include an accelerometer, a speedometer, a Global Positioning System (GPS) receiver or device, a gyroscope or a compass, or a combination thereof. The vehicle 202 can include the environmental sensors 210 other than or in addition to the location-movement sensor 212 that can provide lane information to aid in the identification of the position of the vehicle 202.

The visual sensor 214 can include a sensor for detecting or determining visual information representing the environment within and external to and surrounding of the vehicle 202, including the high-definition camera sensor 214. The visual sensor 214 can include a camera attached to or integral with the vehicle 202 or the first device 102. For example, the visual sensor 214 can include a camera, such as forward facing camera, a rear-view or back-up camera, a side-view or a blind-spot camera, an interior cabin camera, or a combination thereof for detecting the proximate vehicle 222. Also, for example, the visual sensor 214 can include an infrared sensor or a night vision sensor.

The visual sensor 214 can further include a camera on the first device 102 or another user device of the user 112 connected to and interacting with the vehicle 202. The visual sensor 214 can further include the interior cabin camera for detecting or determining visual information inside the vehicle 202 or cabin of the vehicle 202. The visual sensor 214 operating as the cabin camera can monitor a stress level or attention of the user 112 while the vehicle 202 is in operation. The visual sensor 214 can be a high-definition camera that supports the JPEG2000 standard or better. The visual sensor 214 will have a minimum 4096×4096 pixel density for creating the sensor data packet 111 of FIG. 1.

The radar sensor 216 can include an object-detection system, device, or circuit. The radar sensor 216 can determine or identify an existence of an object or a target, such as an obstacle or the proximate vehicle 222, external to the first device 102 or the vehicle 202, a relative location or a distance between the object or the target and the first device 102 or the vehicle 202, or a combination thereof.

The radar sensor 216 can utilize radio waves to determine or identify an existence of the object or the target, the relative location or a distance relative to the vehicle 202 or the first device 102 or the proximate vehicle 222, or a combination thereof. For example, the radar sensor 216 can include a proximity sensor or warning system, such as for an area in front of, behind, adjacent to or on a side of, or a combination thereof geographically or physically relative to the vehicle 202.

The accessory sensor 218 can include a sensor for determining or detecting a status of a subsystem or a feature of the first device 102 or the vehicle 202. The accessory sensor 218 can determine or detect the status or a setting for windshield wipers, turn signals, gear setting, headlights, steering wheel direction, brake pressure, speed, acceleration, or a combination thereof of the vehicle 202.

The navigation system 100 can use one or more of the environmental sensors 210 corresponding to one or more devices, one or more of the vehicle 202, or a combination thereof to generate the route detail 109 describing or representing information regarding the environment within or surrounding the corresponding device or the vehicle 202. The route detail 109 can be further processed with the vehicle control circuit 206, stored in the vehicle storage circuit 208, communicated to another device or vehicle through the vehicle communication circuit 204, or a combination thereof.

As a more specific example, the vehicle communication circuit 204, the vehicle control circuit 206, the vehicle storage circuit 208, the environmental sensors 210, one or more interfaces, or a combination thereof can be included in or make up the first device 102 included in or integral with the vehicle 202. Also, as a more specific example, the vehicle 202 can include or be integral with the first device 102, including an embedded navigation system, an infotainment system, a smart driving or a driver assistance system, a self-driving or a maneuvering system for the vehicle 202, or a combination thereof.

The travel-lane identification 230 is a representation of a traffic lane 232 occupied or travelled by the vehicle 202 or the first device 102. The travel-lane identification 230 can be based on a numbering or a naming system. For example, the travel-lane identification 230 of the traffic lane 232 closest to an outer edge or boundary of the corresponding lane can be "outer" or "last" lane. Also, for example, the travel-lane identification 230 of the traffic lane 232 closest to the center of the road, nearest to a lane for opposite direction of travel, or a combination thereof can be numbered "1" or "0", "inner" or "first" lane.

The travel-lane identification 230 can identify, describe, or represent the traffic lane 232 occupied or traversed by the first device 102, including the vehicle 202. The navigation system 100 can control, maneuver, generate signals or navigation instructions 120 corresponding thereto, or a combination thereof for the vehicle 202 based on the travel-lane identification 230 and specifically for currently occupied or travelled lane. The navigation system 100 can further generate or process the vehicle movement control 228 based on the route detail 109 from multiple vehicles.

The navigation system 100 can process and generate the vehicle movement control 228 for controlling or maneuvering the vehicle 202. The vehicle movement control 228 is an instruction, a signal, a process, a method, a mechanism, or a combination thereof directing or controlling physical movement or travel of the vehicle 202.

For example, the navigation system 100 can generate the vehicle movement control 228 for maneuvering or controlling the vehicle 202 based on or according to the travel-lane identification 230 of the vehicle 202 and specific to the traffic lane 232 occupied or being traversed by the vehicle 202.

The navigation system 100 can further identify an adjacent lane 234. The adjacent lane 234 can include an instance of the traffic lane 232 next to or abutting the traffic lane 232 occupied or traversed by the vehicle 202.

The traffic lane 232 can be a roadway designated for use by a single line of vehicles. The traffic lane 232 can include major highways, one-lane roads designated as one-way traffic, express lanes, parking lanes, auxiliary lanes, and dedicated lanes. The traffic lane 232 can also include a lane, such as a section or an area, for travel by one vehicle in a particular direction, such as on a highway or a road.

The navigation system 100 can communicate the route detail 109 between the second device 106, the first device 102, the network 104, the proximate vehicle 222, the vehicle 202, or a combination thereof. For an illustrative example, the navigation system 100 can include the first device 102 within the vehicle 202 as an instance of the proximate vehicle 222, with the group of vehicles within a predetermined distance, relatively located according to a predetermined arrangement, or a combination thereof.

Continuing with the example, the navigation system 100 can utilize the route detail 109 to provide information, assist maneuvering, control maneuvers, publish HD maps of previously uncharted areas, or a combination thereof for other vehicles, such as the separate vehicle including another instance of the proximate vehicle 222, the vehicle 202, or a combination thereof. The navigation system 100 can communicate the route detail 109 directly from the second device 106 to the proximate vehicle 222 or through the first device 102 to the vehicle 202 for processing and storage.

Continuing with the example, the navigation system 100 can communicate the route detail 109 through the second device 106 to other devices or vehicles, or directly communicate to the other devices or vehicles, such as for a peer-to-peer communication system. The navigation system 100 can communicate the route detail 109 for informing other devices or vehicles of the location or status of the proximate vehicle 222 itself, about other vehicles detected and identified around the vehicle 202, or a combination thereof.

As a more specific example, the navigation system 100 can use the route detail 109 to generate the navigation instruction 120 for the vehicle movement control 228, such as for steering, braking, setting or adjusting travel speed, accessary control, or a combination thereof. Details regarding the processing of the vehicle movement control 228 are discussed below.

Figure 3:
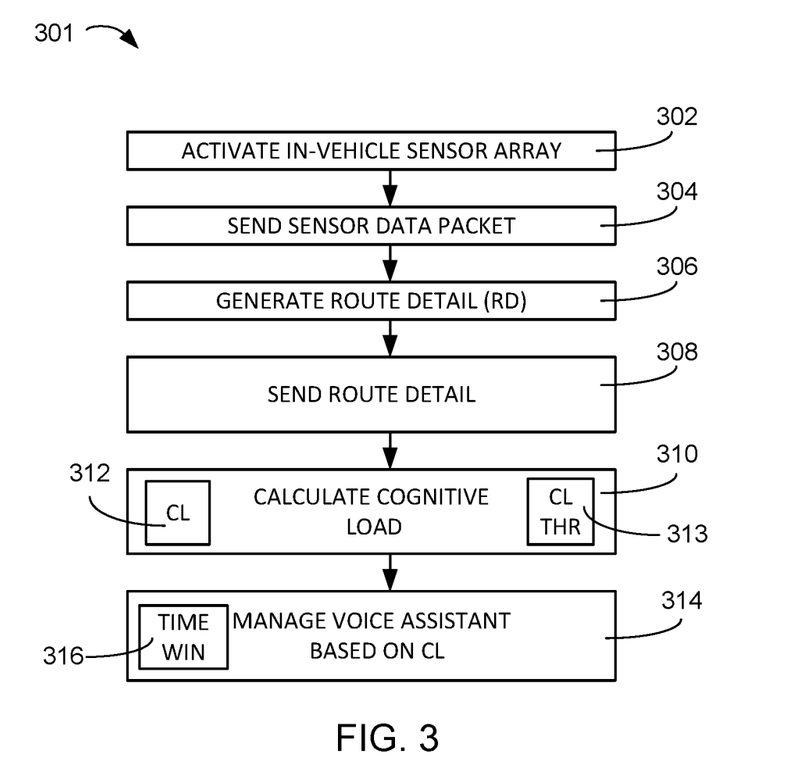
FIG. 3 is an exemplary control flow diagram of the voice assistant mechanism in an embodiment of the present invention.

Referring now to FIG. 3, therein is shown an exemplary control flow diagram of the voice assistant mechanism 301 in an embodiment of the present invention. The exemplary control flow diagram of the voice assistant mechanism 301 depicts an activate in-vehicle sensor array module 302. The activate in-vehicle sensor array module 302 can be a software operating on specific hardware that can activate and evaluate the array of sensors in the vehicle 202 of FIG. 2, including environmental sensors 210 of FIG. 2. The environmental sensors 210 can include the location-movement sensor 212 of FIG. 2, the optical sensor 214 of FIG. 2, the radar sensor 216 of FIG. 2, the accessory sensor 218 of FIG. 2, or a combination thereof.

The activate in-vehicle sensor array module 302 can collect the information from the environmental sensors 210 including the optical sensors 214 to compile the sensor data packet 111 of FIG. 1. The optical sensors 214 in combination with the accessory sensor 218 can provide facial clues and status of the vehicle 202 to evaluate the stress experienced by the user 112. The sensor data packet 111 can contain sufficient information to understand the operation of the vehicle 202 including the environment surrounding the vehicle 202 and the reactions of the user 112. The flow can proceed to a send sensor data packet module 304. The send sensor data packet module 304 can be a software operating on specific hardware that can make the sensor data packet 111 available for processing by the vehicle 202 or the second device 106. The send sensor data packet module 304 can activate the vehicle communication circuit 204 of FIG. 2 to send the sensor data packet 111 to the second device 106 of FIG. 1 and load it into the vehicle storage circuit 208 of FIG. 2 for processing by the vehicle control circuit 206 of FIG. 2. The flow proceeds to a generate route detail module 306.

The generate route detail module 306 can be a software operating on hardware that can combine the information from the sensor data packet 111 and the high-definition map 116 of FIG. 1. The generate route detail module 306 can generate the route detail (RD) 109 of FIG. 1 to provide additional information about the terrain, condition of the traffic lanes 232 of FIG. 2, and traffic congestion that is on the current route 113 of FIG. 1. The generate route detail module 306 can identify areas of the current route 113 that can stress the capabilities of the user 112 of FIG. 1 due to road conditions, complicated maneuvers, or congestion in the traffic lanes 232. The flow proceeds to a send route detail module 308.

The send route detail module 308 can be a software operating on specific hardware that can transfer the route detail 109 from the second device 106 to the vehicle 202 for further processing. The send route detail module 308 can send the route detail 109 through the network 104 of FIG. 1 to the vehicle 202 or the proximate vehicle 222 of FIG. 2. Upon receiving the route detail 109, the vehicle 202 can submit the current route 113, the route detail 109, and the sensor data packet 111 to the voice assistant coordinator 110. The flow proceeds to a calculate cognitive load module 310.

The calculate cognitive load module 310 can be a software operating on specific hardware that can calculate a cognitive load 312 and a cognitive load threshold 313 of the user 112. The cognitive load 312 can be a value that correlates to the amount of stress or distraction the user 112 is subject to while operating the vehicle 202. The calculate cognitive load module 310 can evaluate the route detail 109, the current route 113, and the sensor data packet 111 in order to anticipate the cognitive load 312 experienced by the user 112. By way of an example, if the current route 113 includes a curvy section identified by the route detail 109 and the sensor data packet 111 indicates that the right front tire has low tire pressure, the cognitive load 312 of the user 112 is going to increase due to the lack of precise control in the curves.

The cognitive load threshold 313 can be a dynamic value based on the skill and attentiveness of the user 112. The calculate cognitive load module 310 can monitor the sensor data packet 111 to determine value of the cognitive load threshold 313 for the user 112. The information provided by the optical sensors 214 can allow the calculate cognitive load module 310 to establish the cognitive load threshold by learning the reactions of the user 112 while monitoring the status of the environmental sensors 210. Once the calculate cognitive load module 310 has established the cognitive load threshold 313 for the user 112, the voice assistant coordinator 110 can evaluate the amount of the cognitive load 312 experienced by the user 112 relative to the cognitive load threshold 313.

The cognitive load 312 experienced by the user 112 can depend on many factors, including the presence of the proximate vehicle 222, condition of the traffic lane 232, complexity of a pending maneuver, condition of the vehicle 202, and fatigue of the user 112. The fatigue of the user 112 can be evaluated by analysis of the visual sensor 214, including the interior cabin camera 214, the location-movement sensor 212 that can provide lane image information to aid in the identification of the position of the vehicle 202, and the accessory sensor 218 can detect the status or a setting, for windshield wipers, turn signals, gear setting, headlights, steering wheel direction, brake pressure, speed, acceleration, or a combination thereof, of the vehicle 202.

The voice assistant coordinator 110 can provide a weighted sum of factors that can affect the user 112 of the vehicle 202. The primary factor is the cognitive load 312 of the user 112 relative to the cognitive load threshold 313, but other factors can also change the weighting. By way of an example, the vehicle 202 can be low on fuel, as determined from the sensor data packet 111 or a traffic congestion in the traffic lane 232 may require a change to the adjacent lane 234. Each of these factors can shift the calculation of the cognitive load 312. It is understood that when the cognitive load 312 of the user 112 is above the cognitive load threshold 313, the user 112 can make mistakes, miss the navigation instruction 120 of FIG. 1, not recognize a dangerous situation, such as the proximate vehicle 222 changing the traffic lanes 232, in front of the vehicle 202, with insufficient clearance.

The voice assistant coordinator 110 can also consider the current route 113 and the distance to the navigation instruction 120, as provided by the route detail 109, and the cognitive load 312 of the user 112 in order to manage the audio interaction 124 of FIG. 1 between the user 112 and the navigation system 100 by the voice assistant module 114 of FIG. 1. The flow proceeds to a manage voice assistant based on CL module 314.

The manage voice assistant based on CL module 314 can be a software operating on hardware that can manage the delivery and receipt of the audio interaction 124. The voice assistant module 114 can get the navigation instruction 120 from the voice assistant coordinator 110 along with an indicator of the cognitive load 312 of the user 112. A low value of the cognitive load 312 that is less than or equal to the cognitive load threshold 313 can indicate that the user 112 is not under unusual stress and can respond to the navigation instruction 120 in a time window 316. Likewise, the low value of the cognitive load 312 can indicate the user 112 will respond with the user response 122 within the time window 316.

If however, the cognitive load 312 is a high value, that is greater than the cognitive load threshold 313, the user can be under unusual stress and the voice assistant module 114 can delay delivery of the navigation instruction 120 until the cognitive load 312 of the user 112 is reduced to less than or equal to the cognitive load threshold 313. Similarly, the voice assistant module 114 can provide additional time for the time window 316 for the user response 122 when the cognitive load 312 is above the cognitive load threshold 313. The time window 316 can be defined as the standard duration that the navigation system 100 would expect the user response 122. The voice assistant module 114 can dynamically adjust the duration of the time window 316 based on the cognitive load 312 of the user 112. It is understood that the voice assistant module 114 can adjust the time window 316 for the navigation instruction 120 and the user response 122.

It has been discovered that the navigation system 100 can provide a delay in the delivery of the navigation instruction 120 and additional time for the user response 122 when the cognitive load 312 of the user 112 is above the cognitive load threshold 313. The delay can allow the user 112 to manage the conditions that cause the increase in cognitive load 312 before adding to the distraction of the user by delivering the navigation instruction 120. The voice assistant module 114 can also provide additional time for the user response 122 when the cognitive load is above the cognitive load threshold 313. The voice assistant coordinator 110 can establish a normal delivery timing of the navigation instruction 120 when the cognitive load is less than or equal to the cognitive load threshold 313 and a maximum delay timing when the cognitive load 312 is above the cognitive load threshold 313. The voice assistant module 114 can dynamically adjust the delivery of the navigation instruction 120 based on the lowering of the cognitive load 312. Similarly, the voice assistant module 114 can receive the user response 122 up to the maximum delay time established by the voice assistant coordinator 110. The delay timing of the navigation instruction 120 and user response 122 can reduce the cognitive load 312 of the user 112 and improve the safety of the operation of the vehicle 202.

Figure 4:
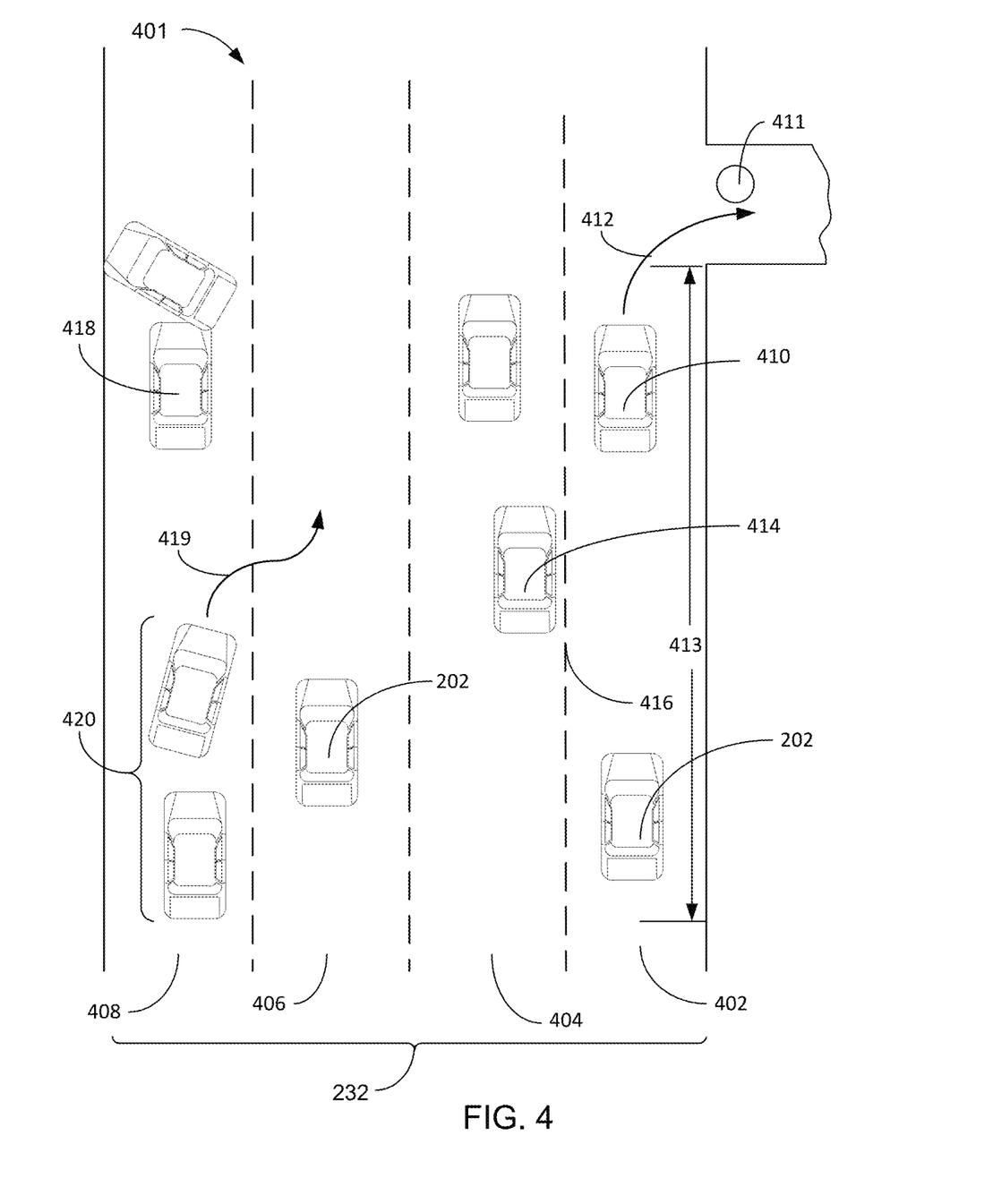
FIG. 4 is an exemplary overhead view of a region of travel as processed by the navigation system.

Referring now to FIG. 4, therein is shown an exemplary overhead view of a region of travel 401 as processed by the navigation system 100. The region of travel 401 can include traffic lanes 232, including a number 1 lane 402, a number 2 lane 404, a number 3 lane 406, and a number 4 lane 408. By way of an example, the vehicle 202 can be positioned in the number 1 lane 402 and approaching a first other vehicle 410, such as a slower vehicle, in the number 1 lane 402. The vehicle 202 can be forced to slow or change to the number 2 lane 404, but the presence of an intersection 411 directly in front of the first other vehicle 410 can alter the decision if the current route 113 of FIG. 1 requires a turn maneuver 412 at the intersection 411. The cognitive load 312 of the user 112 would be in the normal range and the navigation instruction 120 for the turn maneuver 412 can be delivered by the voice assistant module 114 of FIG. 1 in an alert distance 413 from the intersection 411.

Continuing the example, the presence of a second other vehicle 414 in the number 2 lane 404, that is close to a lane line 416, can elevate the cognitive load 312 of the user 112 of the vehicle 202, because the second other vehicle 414 can enter the number 1 lane 402 leaving an unsafe spacing to the vehicle 202. In this example, the cognitive load 312 of the user 112 of the vehicle 202 can be elevated and can cause the voice assistant module 114 to delay the delivery of the navigation instruction 120, beyond the alert distance 413 from the intersection 411, until the cognitive load 312 of the user 112 of the first vehicle 202 returns to a normal state. The voice assistant module 114 can delay the delivery of the navigation instruction 120 until a minimum required distance from the intersection 411 allows the user 112 of the vehicle 202 to execute the turn maneuver 412.

In another example, the vehicle 202 could be travelling in the number 3 lane 406, when a traffic accident 418 is encounter in the number 4 lane 408, which would cause other vehicles 420 to merge into the number 3 lane 406 at a slow speed. As the other vehicles 420, that are stuck behind the traffic accident 418, perform a merge 419 from the number 4 lane 408 to the number 3 lane 406 in front of the vehicle 202, the cognitive load 312 of the user 112 of the vehicle 202 can be elevated. During this period, the voice assistant module 114 can issue alert warnings, but the navigation instructions 120 can be delayed and any pending of the user response 122 can be extended. As the vehicle 202 passes the traffic accident 418, the cognitive load 312 of the user 112 of the vehicle 202 can return to normal and any of the navigation instruction 120 would be delivered in the alert distance 413 from the maneuver. It is understood that the examples provided are for ease of explanation and not to be used in a limiting basis, as other examples of the cognitive load 312 are expected.

It has been discovered that the calculation of the cognitive load of the user 112 of the vehicle 202 can dynamically adjust the delivery of the audio interaction 124 of FIG. 1, including the navigation instruction 120 and the user response 122. Since the cognitive load 312 is an indicator of the amount of stress or distraction experienced by the user 112 of the vehicle 202, dynamically managing the delivery of the audio interactions 124, with secondary concern of the distance to navigation maneuver, can improve the safety of operation of the navigation system 100 and the vehicle 202.

Figure 5:
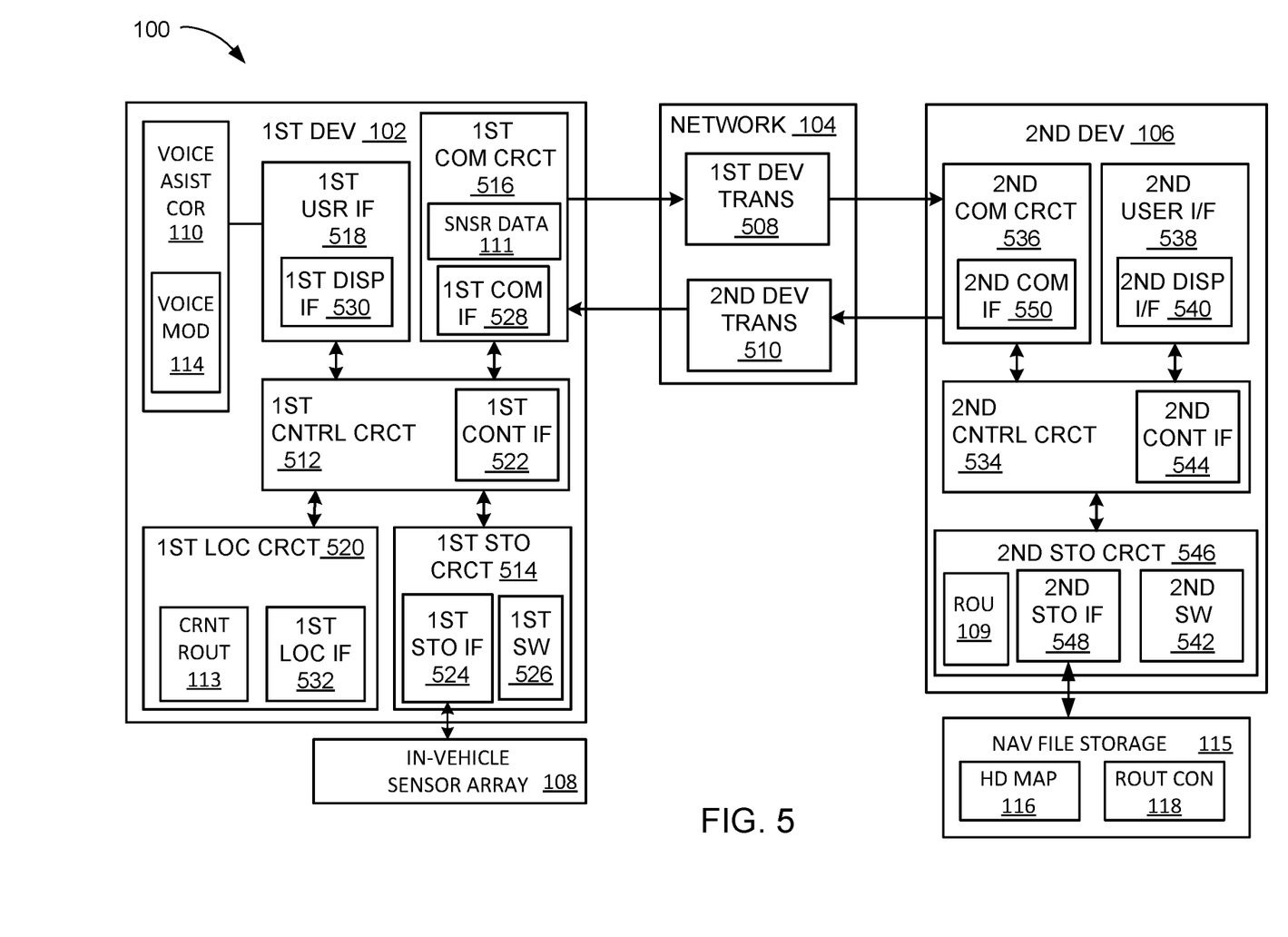
FIG. 5 is an exemplary block diagram of the navigation system.

Referring now to FIG. 5, therein is shown an exemplary block diagram of the navigation system 100 of FIG. 1. The navigation system 100 can include the first device 102, the network 104, and the second device 106. The first device 102 can send information in a first device transmission 508 over the network 104 to the second device 106. The second device 106 can send information in a second device transmission 510 over the network 104 to the first device 102.

For illustrative purposes, the navigation system 100 is shown with the first device 102 as a client device, although it is understood that the navigation system 100 can include the first device 102 as a different type of device including the vehicle 202 of FIG. 2. For example, the first device 102 can be a server containing a display interface.

Also for illustrative purposes, the navigation system 100 is shown with the second device 106 as a server, although it is understood that the navigation system 100 can include the second device 106 as a different type of device. For example, the second device 106 can be a client device.

Also, for illustrative purposes, the navigation system 100 is shown with interaction between the first device 102 and the second device 106. However, it is understood that the first device 102 can similarly interact with the vehicle 202 of FIG. 2, the proximate vehicle 222 of FIG. 2, or a combination thereof. Similarly, the second device 106 can similarly interact with the vehicle 202, the proximate vehicle 222, or a combination thereof.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 512, a first storage circuit 514, a first communication circuit 516, a first user interface 518, and a first location circuit 520. The first control circuit 512 can include a first control interface 522. The first control circuit 512 can execute a first software 526 to provide the intelligence of the navigation system 100 to enable the in-vehicle sensor array 108 of FIG. 1, transfer the sensor data stream 110, and calculate the cognitive load 312 of FIG. 3.

The first control circuit 512 can be implemented in a number of different manners. For example, the first control circuit 512 can be a processor, an application specific integrated circuit (ASIC) an embedded processor, a microprocessor, a hardware control logic, a hardware finite state machine (FSM), a digital signal processor (DSP), or a combination thereof. The first control interface 522 can be used for communication between the first control circuit 512 and other functional units or circuits in the first device 102. The first control interface 522 can also be used for communication that is external to the first device 102.

The first control interface 522 can receive information from the other functional units/circuits or from external sources, or can transmit information to the other functional units/circuits or to external destinations. The external sources and the external destinations refer to sources and destinations external to the first device 102.

The first control interface 522 can be implemented in different ways and can include different implementations depending on which functional units/circuits or external units/circuits are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The first storage circuit 514 can store the first software 526. The first storage circuit 514 can also store the relevant information, such as data representing the sensor data packet 111, the route detail 109, sound files, the current route 113, or a combination thereof.

The first storage circuit 514 can be a volatile memory, a nonvolatile memory, an internal memory, an external memory, or a combination thereof. For example, the first storage circuit 514 can be a nonvolatile storage such as non-volatile random access memory (NVRAM), Flash memory, disk storage, or a volatile storage such as static random access memory (SRAM).

The first storage circuit 514 can include a first storage interface 524. The first storage interface 524 can be used for communication between the first storage circuit 514 and other functional units or circuits in the first device 102, such as the in-vehicle sensor array 108, the first control circuit 512, the first communication circuit 516, or a combination thereof. The first storage interface 524 can also be used for communication that is external to the first device 102.

The first storage interface 524 can receive information from the other functional units/circuits or from external sources, or can transmit information to the other functional units/circuits or to external destinations. The external sources and the external destinations refer to sources and destinations external to the first device 102.

The first storage interface 524 can include different implementations depending on which functional units/circuits or external units/circuits are being interfaced with the first storage circuit 514. The first storage interface 524 can be implemented with technologies and techniques similar to the implementation of the first control interface 522.

The first communication circuit 516 can enable external communication to and from the first device 102. For example, the first communication circuit 516 can permit the first device 102 to communicate with the second device 106, an attachment, such as a peripheral device or a desktop computer, and the network 104.

The first communication circuit 516 can also function as a communication hub allowing the first device 102 to function as part of the network 104 and not limited to be an end point or terminal circuit to the network 104. The first communication circuit 516 can include active and passive components, such as microelectronics or an antenna, for interaction with the network 104.

The first communication circuit 516 can include a first communication interface 528. The first communication interface 528 can be used for communication between the first communication circuit 516 and other functional units or circuits in the first device 102. By way of an example the first communication circuit 516 can retrieve the sensor data packet 111, from the in-vehicle sensor array 108, through the first storage interface 524 in order to transmit it to the second device 106 for further processing and distribution. The first communication interface 528 can receive information from the second device 106, including the route detail 109, for distribution to the other functional units/circuits or can transmit information to the other functional units or circuits.

The first communication interface 528 can include different implementations depending on which functional units or circuits are being interfaced with the first communication circuit 516. The first communication interface 528 can be implemented with technologies and techniques similar to the implementation of the first control interface 522.

The first user interface 518 allows the user 112 of FIG. 1 to interface and interact with the first device 102 through the voice assistant module 114. The first user interface 518 can include an input device and an output device that can operate through the voice assistant module 114. Examples of the input device of the first user interface 518 can include a keypad, a touchpad, soft-keys, a keyboard, a microphone, an infrared sensor for receiving remote signals, or any combination thereof to provide data and communication inputs. By way of an example, the user response 122 of FIG. 1 can be input to the first user interface 518 through a wireless audio connection. The first user interface 518 can pass the input from the voice assistant module 114 to the first control circuit 112 for processing and storage.

The first user interface 518 can include a first display interface 530. The first display interface 530 can include an output device. The first display interface 530 can include a display, a projector, a video screen, a speaker, or any combination thereof. The first user interface 518 can include the wireless audio device, such as a speaker, for broadcasting the navigation instruction 120 of FIG. 1.

The first control circuit 512 can operate the first user interface 518 to display information generated by the navigation system 100 or enable the audio interactions 124 of FIG. 1. The first control circuit 512 can also execute the first software 526 for the other functions of the navigation system 100, including receiving location information from the first location circuit 520 and logging the current route 113. The first control circuit 512 can further execute the first software 526 for interaction with the network 104 via the first communication circuit 516.

The first control circuit 512 can operate the first user interface 518 to collect data from the user 112 in the form of the user response 122, including point-of-interest requests, service requests, accommodation requests, cell phone activation requests, or combinations thereof. The first control circuit 512 can also receive location information from the first location circuit 520. The first control circuit 512 can compile the sensor data packet 111, including the location data from the first location circuit 520, time, and the data from the current route 113. The first control circuit 512 can send the sensor data packet 111, through the first communication circuit 516, to the second device 106 for processing.

The first location circuit 520 can generate location information, current heading, current acceleration, and current speed of the first device 102, as examples. The first location circuit 520 can be implemented in many ways. For example, the first location circuit 520 can function as at least a part of the global positioning system, an inertial navigation system, a cellular-tower location system, a pressure location system, or any combination thereof. Also, for example, the first location circuit 520 can utilize components such as an accelerometer or global positioning system (GPS) receiver. The first location circuit 520 can provide distancing information to the first control circuit 512 for calculating pseudo ranges for the global positioning system or the cell-tower location system.

The first location circuit 520 can include a first location interface 532. The first location interface 532 can be used for communication between the first location circuit 520 and other functional units or circuits in the first device 102. The first location interface 532 can also be used for communication external to the first device 102.

The first location interface 532 can receive information from the other functional units/circuits or from external sources, or can transmit information to the other functional units/circuits or to external destinations. The external sources and the external destinations refer to sources and destinations external to the first device 102.

The first location interface 532 can include different implementations depending on which functional units/circuits or external units/circuits are being interfaced with the first location circuit 520. The first location interface 532 can be implemented with technologies and techniques similar to the implementation of the first control circuit 512. It is understood that the first location circuit 520 and the first location interface 532 are a part of or can be integrated into the first device 102, the vehicle 202, or a combination thereof.

The second device 106 can be optimized for implementing an embodiment of the present invention in a multiple device embodiment with the first device 102. The second device 106 can provide the additional or higher performance processing power compared to the first device 102. The second device 106 can include a second control circuit 534, a second communication circuit 536, a second user interface 538, and a second storage circuit 546.

The second user interface 538 allows a user (not shown) to interface and interact with the second device 106. The second user interface 538 can include an input device and an output device. Examples of the input device of the second user interface 538 can include a keypad, a touchpad, softkeys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control circuit 534 can receive the sensor data packet 111 through the second communication circuit 536. The second control circuit can verify the content of the sensor data packet 111 and integrate information from the high-definition map 116 in the route context module 118 to generate the route detail 109. Once the route detail 109 is prepared for transfer to the first device 102, the second communication circuit can transfer the route detail 109 through the second device transfer 510.

The second control circuit 534 can execute a second software 542 to provide the intelligence of the second device 106 of the navigation system 100. The second software 542 can operate in conjunction with the first software 526. The second control circuit 534 can provide additional performance compared to the first control circuit 512.

The second control circuit 534 can operate the second user interface 538 to display information. The second control circuit 534 can also execute the second software 542 for the other functions of the navigation system 100, including operating the second communication circuit 536 to communicate with the first device 102 over the network 104.

The second control circuit 534 can be implemented in a number of different manners. For example, the second control circuit 534 can be a processor, an embedded processor, a microprocessor, hardware control logic, a hardware finite state machine (FSM), a digital signal processor (DSP), or a combination thereof.

The second control circuit 534 can include a second control interface 544. The second control interface 544 can be used for communication between the second control circuit 534 and other functional units or circuits in the second device 106. The second control interface 544 can also be used for communication that is external to the second device 106.

The second control interface 544 can receive information from the other functional units/circuits or from external sources, or can transmit information to the other functional units/circuits or to external destinations. The external sources and the external destinations refer to sources and destinations external to the second device 106.

The second control interface 544 can be implemented in different ways and can include different implementations depending on which functional units/circuits or external units/circuits are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, or a combination thereof.

The second storage circuit 546 can store the second software 542. The second storage circuit 546 can also store the information such as data representing incoming images, data representing previously presented image, sound files, or a combination thereof. The second storage circuit 546 can be sized to provide the additional storage capacity to supplement the first storage circuit 514.

For illustrative purposes, the second storage circuit 546 is shown as a single element, although it is understood that the second storage circuit 546 can be a distribution of storage elements. Also, for illustrative purposes, the navigation system 100 is shown with the second storage circuit 546 as a single hierarchy storage system, although it is understood that the navigation system 100 can include the second storage circuit 546 in a different configuration. For example, the second storage circuit 546 can be formed with different storage technologies forming a memory hierarchal system including different levels of caching, main memory, rotating media, or off-line storage.

The second storage circuit 546 can be a volatile memory, a nonvolatile memory, an internal memory, an external memory, or a combination thereof. For example, the second storage circuit 546 can be a nonvolatile storage such as non-volatile random access memory (NVRAM), Flash memory, disk storage, or a volatile storage such as static random access memory (SRAM).

The second storage circuit 546 can include a second storage interface 548. The second storage interface 548 can be used for communication between the second storage circuit 546 and other functional units or circuits in the second device 106. The second storage interface 548 can also be used for communication that is external to the second device 106, such as the navigation file storage 115, which can maintain the high-definition map 116 and the route context module 118.

The second storage interface 548 can receive information from the other functional units/circuits or from external sources, or can transmit information to the other functional units/circuits or to external destinations. The external sources and the external destinations refer to sources and destinations external to the second device 106.

The second storage interface 548 can include different implementations depending on which functional units/circuits or external units/circuits are being interfaced with the second storage circuit 546. The second storage interface 548 can be implemented with technologies and techniques similar to the implementation of the second control interface 544.

The second communication circuit 536 can enable external communication to and from the second device 106. For example, the second communication circuit 536 can permit the second device 106 to communicate with the first device 102 over the network 104. By way of an example, the second device 106 can provide the route detail 109 to the first device 102 in response to a request from the user 112.

The second communication circuit 536 can also function as a communication hub allowing the second device 106 to function as part of the network 104 and not limited to be an end point or terminal unit or circuit to the network 104. The second communication circuit 536 can include active and passive components, such as microelectronics or an antenna, for interaction with the network 104.

The second communication circuit 536 can include a second communication interface 550. The second communication interface 550 can be used for communication between the second communication circuit 536 and other functional units or circuits in the second device 106. The second communication interface 550 can receive information from the other functional units/circuits or can transmit information to the other functional units or circuits.

The second communication interface 550 can include different implementations depending on which functional units or circuits are being interfaced with the second communication circuit 536. The second communication interface 550 can be implemented with technologies and techniques similar to the implementation of the second control interface 544.

The first communication circuit 516 can couple with the network 104 to send the sensor data packet 111 including the current route 113 to the second device 106 in the first device transmission 508. The second device 106 can receive information in the second communication circuit 536 from the first device transmission 508 of the network 104.

The second communication circuit 536 can couple with the network 104 to send information to the first device 102 in the second device transmission 510. The first device 102 can receive information in the first communication circuit 516 from the second device transmission 510 of the network 104. The navigation system 100 can be executed by the first control circuit 512, the second control circuit 534, or a combination thereof. For illustrative purposes, the second device 106 is shown with the partition containing the second user interface 538, the second storage circuit 546, the second control circuit 534, and the second communication circuit 536, although it is understood that the second device 106 can include a different partition. For example, the second software 542 can be partitioned differently such that some or all of its function can be in the second control circuit 534 and the second communication circuit 536. Also, the second device 106 can include other functional units or circuits not shown in FIG. 5 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

For illustrative purposes, the navigation system 100 is described by operation of the first device 102 and the second device 106. It is understood that the first device 102 and the second device 106 can operate any of the modules and functions of the navigation system 100.

By way of a further example, the first device 102 can be the vehicle 202. The first user interface 518 can receive input from the location-movement sensor 212 of FIG. 2, the visual sensor 214 of FIG. 2, such as the high-definition camera sensor 214 of FIG. 2, the radar sensor 216 of FIG. 2, the accessory sensor 218 of FIG. 2, or the combination thereof for compiling the sensor data packet 111. The sensor data packet 111 can be generated by the first control circuit 512 from the location-movement sensor 212, the visual sensor 214, such as the high-definition camera sensor 214, the radar sensor 216, the accessory sensor 218, or the combination thereof. The sensor data packet 111 can be sent through the first communication circuit 516 and the network 104 to the second device 106 for incorporation in the route detail 109.

It has been discovered that the first device 102 can transmit the sensor data packet 111 to the second device 106 for incorporation into the route detail 109. The return of the route detail 109 to the first device 102 allows the first control unit 512 to calculate the cognitive load 312 for the user 112 of the vehicle 202 based on the route detail 109 and the sensor data packet 111. The first control unit 512 can operate the voice assistant coordinator 110 to manage the voice assist module 114 in the communication between the user 112 and the navigation system 100 through the audio interaction 124. By monitoring the cognitive load 312 of the user 112, the navigation instruction 120 can be delayed when the cognitive load 312 is high, which can prevent the user 112 from excessive stress that can cause mistakes or accidents due to distraction of the user 112.

Figure 6:
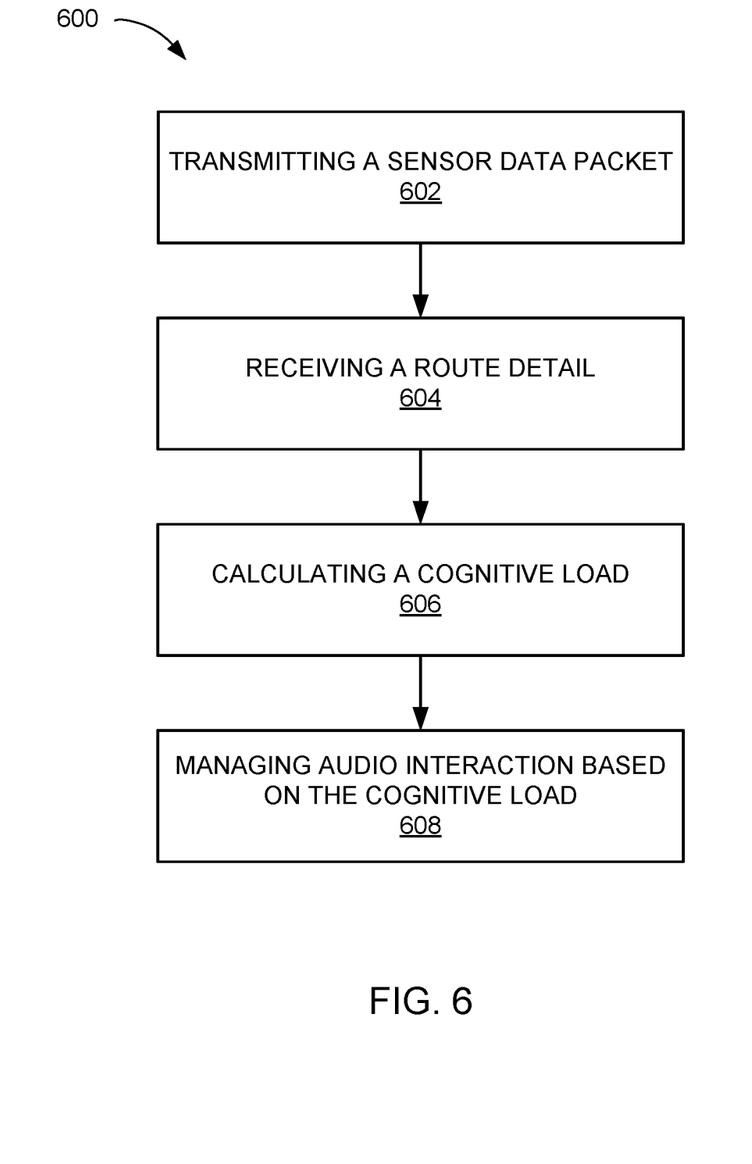
FIG. 6 is a flow chart of a method of operation of a navigation system in an embodiment of the present invention.

Referring now to FIG. 6, therein is shown a flow chart of a method 600 of operation of a navigation system 100 of FIG. 1 in an embodiment of the present invention. The method 600 includes: transmitting a sensor data packet collected from an in-vehicle sensor array in block 602; receiving a route detail in response to the sensor data packet in a block 604; calculating a cognitive load based on the sensor data packet and the route detail in a block 606; and managing an audio interaction based on the cognitive load, includes delayed delivery of the audio interaction in a block 608.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A navigation system comprising:
a control circuit configured to:
monitor an in-vehicle sensor array to form a sensor data packet;
receive a route detail based on the sensor data packet;
calculate a cognitive load based on the sensor data packet and the route detail; and
manage an audio interaction based on the cognitive load, includes delayed delivery of the audio interaction and extend a time window for a user response based on the cognitive load.

2. The system as claimed in claim 1 wherein the control circuit is configured to:
integrate the route detail into a current route; and
calculate the cognitive load based on a position of a proximate vehicle, approach of a turn maneuver, and another vehicle in a traffic lane.

3. The system as claimed in claim 1 wherein the control circuit is configured to monitor the cognitive load to release the audio interaction when a vehicle is past an alert distance.

4. The system as claimed in claim 1 wherein the control circuit is configured to manage the audio interaction includes a user response and the audio interaction for a current route.

5. The system as claimed in claim 1 wherein the communication circuit configured to transfer the sensor data packet by streaming data from a location-movement sensor, a high-definition camera sensor, a radar sensor, an accessory sensor, or a combination thereof.

6. The system as claimed in claim 1 wherein the control circuit is configured to:
calculate and monitor the cognitive load based on an interior cabin camera, a location-movement sensor, an accessory sensor, and physical status of a vehicle; and
delay the audio interaction, or extend the user response timing when the cognitive load is above a cognitive load threshold.

7. A method of operation for a navigation system comprising:
receiving a route detail based on the sensor data packet from an in-vehicle sensor array;
calculating a cognitive load based on the sensor data packet and the route detail; and
managing an audio interaction based on the cognitive load, includes delayed delivery of the audio interaction and extending a time window for a user response based on the cognitive load.

8. The method as claimed in claim 7 further compromising:
integrating the route detail into a current route; and
calculating the cognitive load based on a position of a proximate vehicle, approach of a turn maneuver, and another vehicle in a traffic lane.

9. The method as claimed in claim 7 further compromising monitoring the cognitive load to release the audio interaction when a vehicle is past an alert distance.

10. The method as claimed in claim 7 wherein managing the audio interaction includes a user response and the audio interaction for a current route.

11. The method as claimed in claim 7 further comprising transferring the sensor data packet by streaming data from a location-movement sensor, a high-definition camera sensor, a radar sensor, an accessory sensor, or a combination thereof.

12. The method as claimed in claim 7 further comprising:
calculating and monitoring the cognitive load based on an interior cabin camera, a location-movement sensor, an accessory sensor, and physical status of a vehicle; and
delaying the audio interaction, or extending the user response timing when the cognitive load is above a cognitive load threshold.

13. A non-transitory computer readable medium including instructions for a navigation system comprising:
receiving a route detail based on the sensor data packet from an in-vehicle sensor array;
calculating a cognitive load based on the sensor data packet and the route detail; and
managing an audio interaction based on the cognitive load, includes delayed delivery of the audio interaction and extending a time window for a user response based on the cognitive load.

14. The non-transitory computer readable medium including the instructions as claimed in claim 13 further compromising:
 integrating the route detail into a current route; and
 calculating the cognitive load based on a position of a proximate vehicle, approach of a turn maneuver, and an other vehicle in a traffic lane).

15. The non-transitory computer readable medium including the instructions as claimed in claim 13 further comprising monitoring the cognitive load to release the audio interaction when a vehicle is past an alert distance.

16. The non-transitory computer readable medium including the instructions as claimed in claim 13 wherein managing the audio interaction includes a user response and the audio interaction for a current route.

17. The non-transitory computer readable medium including the instructions as claimed in claim 13 further comprising:
 calculating and monitoring the cognitive load based on an interior cabin camera, a location-movement sensor, an accessory sensor, and physical status of a vehicle; and
 delaying the audio interaction, or extending the user response timing when the cognitive load is above a cognitive load threshold.

\* \* \* \* \*